United States Patent
Franey et al.

(10) Patent No.: US 8,573,355 B2
(45) Date of Patent: Nov. 5, 2013

(54) ACOUSTIC BAFFLE DEVICE

(71) Applicant: Henkel AG & Co. KGaA, Duesseldorf (DE)

(72) Inventors: David Franey, Wyandotte, MI (US); Eric Aldstadt, Novi, MI (US); Michael Lupini, Milford, MI (US); Eiji Yanagida, Kounosu (JP)

( * ) Notice: Subject to any disclaimer, the term of this patent is extended or adjusted under 35 U.S.C. 154(b) by 0 days.

(21) Appl. No.: 13/687,573

(22) Filed: Nov. 28, 2012

(65) Prior Publication Data

US 2013/0087406 A1    Apr. 11, 2013

Related U.S. Application Data

(63) Continuation of application No. PCT/US2011/038027, filed on May 26, 2011.

(60) Provisional application No. 61/349,475, filed on May 28, 2010.

(51) Int. Cl.
    *F01N 1/08*    (2006.01)

(52) U.S. Cl.
    USPC ......................................................... 181/264

(58) Field of Classification Search
    USPC ................................................. 181/264, 237
    See application file for complete search history.

(56) References Cited

U.S. PATENT DOCUMENTS

| | | | |
|---|---|---|---|
| 3,164,870 A * | 1/1965 | Stolarczyk et al. | 49/495.1 |
| 4,083,595 A | 4/1978 | Maier | |
| 6,065,564 A * | 5/2000 | Uegane | 181/237 |
| 6,146,565 A | 11/2000 | Keller | |
| 6,244,601 B1 * | 6/2001 | Buchholz et al. | 277/637 |
| 6,413,611 B1 * | 7/2002 | Roberts et al. | 428/99 |
| 7,726,442 B2 * | 6/2010 | Belpaire | 181/237 |
| 8,079,442 B2 | 12/2011 | Wojtowicki | |
| 2005/0082111 A1 * | 4/2005 | Weber | 181/204 |
| 2008/0143147 A1 * | 6/2008 | Lee | 296/193.06 |

FOREIGN PATENT DOCUMENTS

| WO | WO0003894 | 1/2000 |
|---|---|---|
| WO | WO2009021537 | 2/2009 |

OTHER PUBLICATIONS

International Search Report for PCT/US2011/038027, dated Feb. 17, 2012.

* cited by examiner

*Primary Examiner* — Forrest M Phillips
(74) *Attorney, Agent, or Firm* — Mary K. Cameron

(57) ABSTRACT

An acoustic baffle device for sealing a cavity of a vehicle body at a predetermined cross section of the cavity is provided. The device has a carrier having an opening therein, a heat expandable sealing material affixed to the carrier, and a flap assembly having a flap normally held in place by a spring so as to close off the opening, wherein the flap is capable of being deflected by insertion of a tube through the opening.

16 Claims, 9 Drawing Sheets

ACOUSTIC BAFFLE DEVICE

FIELD OF THE INVENTION

The present invention relates to an acoustic baffle device for sealing a cavity of a vehicle body at a predetermined cross section of the cavity.

BACKGROUND OF THE INVENTION

In recent years, the desire to improve vehicles by dampening the noise or vibration that can be generated or transmitted within the cavities of vehicles (such as the various pillars or other hollow structural members typically present in vehicles) has led to the development of acoustic baffle devices that comprise a carrier made of heat resistant plastic or metal to which is mounted one or more portions of a heat activated foamable resin material. The device is positioned within a vehicle cavity and then subjected to heating, causing the resin material to foam and seal off the cavity. However, because of the many different vehicle designs that are being produced and the need to simplify, and thereby lower the cost of, vehicle production, further improvements in such devices are still needed and desired.

For example, in the case of vehicles that may be equipped with sun roofs, it will often be required to introduce drain tubes into one or more cavities that facilitate the removal of water from the area around the sun roof. Typically, such drain tubes are provided after the pillar cavities of the vehicle body have been sealed by means of an acoustic baffle device. However, this is difficult to accomplish without damaging the baffle device and affecting or even destroying its acoustic dampening characteristics. A possible solution for this problem is to include a preconstructed opening in the baffle device, capable of and suitable for receiving a drain tube. However, if such drain tube is not installed, the acoustic dampening performance of the baffle may be compromised due to the opening. One could avoid this by using two different baffle device designs, one having an opening (for installation on vehicles having sunroofs) and another without such an opening (for installation on vehicles without sunroofs). However, this would significantly increase the complexity and cost of producing such vehicles.

There is consequently a strong need for an acoustic baffle system avoiding such disadvantages according to the state of the art, i.e., a device that makes possible the passage of a drain tube (or any other similar object such as an electrical cable or conduit) in a cavity, particularly a pillar cavity, of a vehicle after the expansion of a heat activatable sealing material and that furthermore preserves the acoustic performance profile of the baffle when no such tube or similar device is introduced in the cavity.

BRIEF SUMMARY OF THE INVENTION

The present invention provides an acoustic baffle device equipped with a flap assembly that makes possible the passage of a drain tube or the like through the device during any stage of car manufacturing, including after the expansion of a sealing material, and that furthermore does not adversely impact the acoustic performance profile of the baffle when no tube is introduced in the pillar, i.e., the flap remains in closed position and is held in position against an opening in the baffle device using pressure applied by a spring. The acoustic baffle device of the invention has the further advantage of facilitating the introduction of a drain tube into a vehicle cavity from a remote distance, in a non-accessible area.

Thus, one aspect of the invention provides an acoustic baffle device for sealing a cavity of a vehicle body at a predetermined cross section of the cavity, comprising a carrier having an opening therein, a heat expandable sealing material affixed to the carrier, and a flap assembly having a flap normally held in place by a spring so as to close off the opening, wherein the flap is capable of being deflected by insertion of a tube through the opening.

Another aspect of the invention provides a process for sealing a cavity of a vehicle body at a predetermined cross section of the cavity while permitting the reversible opening of a passage for a flexible drain tube or any similar device, comprising a step of introducing the aforementioned acoustic baffle device into the cavity.

DETAILED DESCRIPTION OF THE INVENTION

Figure 1:
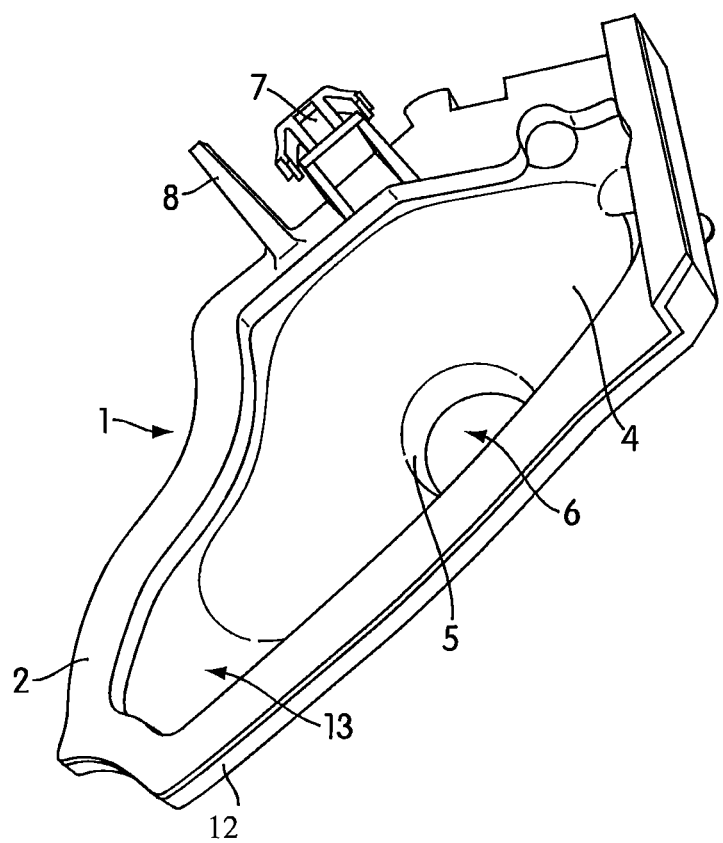
FIGS. 1 and 2 show different perspective views of an acoustic baffle device in accordance with the invention.

According to the present invention, an acoustic baffle device is provided for sealing a pillar cavity of a vehicle body at a predetermined cross section of the cavity. The device comprises one or more portions of heat expandable sealing material affixed to a carrier. The device is formed in a shape corresponding to but somewhat smaller than the shape of the cross section of the cavity. The carrier contains an opening capable of receiving a drain tube or other such object (typically, an elongated object having a generally circular cross-section). The carrier may, for example, be generally concave in shape, with the opening for receiving the drain tube being positioned approximately near the center of the carrier. "Concave" in the context of this invention includes, for example, conical, bowl and funnel shapes. The carrier may contain a neck in the vicinity of the opening that assists in guiding the drain tube as it is being inserted into the opening, such that the insertion can be accomplished easily even from a remote distance without the device being visible to the person inserting the drain tube (for example, where the acoustic baffle device has been positioned deep within a pillar of a vehicle).

The acoustic baffle device is equipped with a "flap assembly", which is preferably secured to the carrier. This flap assembly includes a flap and a spring, which cooperate so as to normally hold the flap in position to close off the opening while allowing the flap to be readily deflected when desired by a tube inserted into the opening from the side of the device opposite the flap.

The sealing material is heat expandable, i.e., capable of being foamed when heated by activation of one or more blowing agents. In one embodiment, the sealing material has an activation temperature in the range of between 130° C. and 210° C. Particularly, the sealing material may be a heat expandable, foaming polymeric composition comprised of polyethylene or other polyolefin and/or ethylene vinylacetate copolymer (EVA) and/or ethylene alkyl(meth)acrylate copolymer such as EMA and/or rubbery block or random copolymer based on styrene and a 1,3 diene.

The heat expandable sealing material can be made, for example, from ethylene/vinylacetate copolymers (EVA), copolymers of ethylene with (meth)acrylate esters, which optionally also contain (meth)acrylic acid incorporated proportionately by polymerization, as well as random copolymers or block copolymers of styrene with butadiene or isoprene or the hydrogenation products thereof. The latter may also be tri-block copolymers of the SBS, SIS type or the hydrogenation products thereof SEBS or SEPS. Mixtures or blends of such polymers may be utilized. In addition, the polymeric compositions may also contain cross-linking agents, coupling agents, fillers, colorants, stabilizers, tackifiers, plasticizers as well as further auxiliary substances and additives. With a view to achieving a sufficient foaming capacity and expandability, these polymeric compositions may also contain blowing agents. Suitable, in principle, by way of blowing agents are all known blowing agents such as, for example, the "chemical blowing agents" which release gases as a result of decomposition or "physical blowing agents", i.e. expanding hollow beads. Examples of the first-mentioned blowing agents are azobisisobutyronitrile, azodicarbonamide, dinitrosopentamethylenetetramine, 4,4'-oxy-bis(benzene-sulfonic acid hydrazide), diphenylsulfone-3,3'-disulfohydrazide, benzene-1,3-disulfohydrazide, and p-toluene-sulfonyl-semicarbazide. Examples of the physical blowing agents are expandable plastic hollow microbeads based on polyvinylidene chloride copolymers or acrylonitrile/(meth)acrylate copolymers, such as are commercially available, for example, under the name "Dualite" from Henkel. In one embodiment, the heat expandable sealing material has an activation temperature below 200° C.

The acoustic baffle device is equipped with a carrier element. The carrier element is provided beneath or around or in one or more portions of heat expandable sealing material for supporting such portions. The carrier may be based on any heat resistant type of plastic, preferably polyamide, most preferably polyamide 6, polyamide 6,6, polyamide 11, polyamide 12 or a mixture thereof. The expression "heat resistant" means here that the material is completely resistant towards temperatures in the range of between 130° C. and 210° C.

The carrier is preferably made from a thermoplastic material with a melting point above the activation temperature range of the heat expandable sealing material. Suitable thermoplastics include polyamides, polyimides, polyoxypropylene or polyethylene terephthalate. In one embodiment, the carrier is made of polyamide. The polyamide or other polymer for making the carrier may contain fibers and/or inorganic fillers as well as other conventionally used adjuvants and additives.

The carrier may be configured so as to direct the expanding foam produced from the heat expandable sealing material towards the cavity walls and to prevent the expanding foam from sagging or distorting in a manner that interferes with complete sealing of the cavity. The amount of heat expandable sealing material that is present in the acoustic baffle device is preferably selected such that, after expansion, its volume occupies the clearance between the acoustic baffle device and the inner surface of the structural element and it is effective in sealing off the cavity and/or suppressing air-borne and/or structure-borne noise transmission within the hollow structural member to the desired degree.

The carrier is preferably comprised of a moldable material which is sufficiently resistant to cracking and breakage during normal usage, and has a melting or softening point that is higher than both the activation temperature of the heat expandable sealing material and the bake temperature that the structural members containing the acoustic baffle device will be exposed to. Preferably, the moldable material is sufficiently resilient (non-brittle) and strong at ambient temperatures to withstand cracking or breaking while also being sufficiently heat resistant at elevated temperatures (e.g., the temperatures employed to foam the heat expandable sealing material) to hold the heat expandable sealing material in the desired position within the cavity of the structural member without significant warping, sagging or distortion. For example, the carrier may be formed of a moldable material that is somewhat pliable and resistant to breaking so that the assembled acoustic baffle device can be subjected to bending forces at room temperature without being cracked or permanently deformed. The material that comprises the carrier is not particularly limited, and for example, may be any number of polymeric compositions that possess these qualities (e.g., polyesters, aromatic polyethers, polyether ketones, and especially polyamides such as nylon 66). Polymeric compositions that are suitable for use as the carrier would be well known to those of ordinary skill in the art and include both thermoplastic and thermoset materials, and thus will not be described in detail herein. Unfoamed (solid) as well as foamed polymeric compositions may be utilized to fabricate the carrier. The moldable materials can, in addition to the polymeric compositions, also comprise various additives and fillers, such as colorants and/or reinforcing fibers (e.g. glass fibers), depending on the desired physical characteristics. Preferably, the moldable material has a melting or softening point (ASTM D789) of at least 200 degrees C., more preferably at least 225 degrees C., or most preferably at least 250 degrees C. and/or has a heat deflection temperature at 18.6 kg (ASTM D648) of at least 180 degrees C., more preferably at least 200 degrees C., or most preferably at least 220 degrees C. and/or a tensile strength (ASTM D638; 50% R.H.) of at least 1000 kg/cm$^2$, more preferably at least 1200 kg/cm$^2$, most preferably at least 1400 kg/cm$^2$ and/or a flexural modulus (ASTM D790; 50% R.H.) of at least 50,000 kg/cm$^2$, more preferably at least 60,000 kg/cm$^2$, most preferably at least 70,000 kg/cm$^2$.

Alternatively, the carrier or one or more portions of the carrier may be fabricated from a metal such as steel or aluminum.

According to one embodiment, the acoustic baffle device includes a carrier, a heat expandable sealing material in accordance with the present invention operably coupled with and supported by at least a portion of the carrier and extending at least around substantially the entire periphery of the acoustic baffle device, and at least one attachment member for holding the acoustic baffle device in the desired position within the cavity. The acoustic baffle device may be substantially concave in shape. For example, the carrier may be configured so as to be conical-, funnel- or bowl-shaped. The central or inner portion of the carrier may be substantially free of any flat areas that will be arranged perpendicular to the longitudinal axis of the cavity. Such a configuration will assist in guiding the drain tube or similar object towards the opening in the carrier and will help avoid the possibility that the leading end of such tube will become hung up on the carrier such that insertion through the opening is not possible or is excessively difficult.

In one embodiment, the interior of the carrier is shaped such that it is relatively wide at the end (the first end) where the tube is to be introduced but narrower at the other end (the second end) where the opening and the flap assembly are positioned. The carrier body interior generally tapers down in diameter between the first end and the second end. In one aspect of the invention, the interior surface of the carrier is smooth. In another aspect, guide rails are positioned around the carrier interior running generally in the direction from the first end to the second end. The surfaces of the guide rails facing towards the carrier interior may be smooth, such that when the end of the inserted tube comes into contact with one or more of such guide rails the tube end is guided towards the opening, thereby facilitating insertion of the tube through the opening.

Typically, the thickness of the heat expandable sealing material that is present at the periphery of the acoustic baffle device is from about 1 to about 10 mm. In this context, "thickness" means the dimension of the acoustic baffle device that is parallel to the longitudinal axis of the hollow structural member in which the device is to be positioned. The width of the heat expandable sealing material may have a similar dimension, e.g., from about 1 to about 10 mm. In this context, "width" means the dimension of the acoustic baffle device that is perpendicular to the longitudinal axis of the hollow structural member. One or both of the thickness and width of the heat expandable sealing material may vary at different points around the periphery of the carrier. Generally speaking, the width and thickness are selected such that the amount of heat expandable sealing material present around the carrier periphery is sufficient to completely seal up around the outside of the acoustic baffle device when the sealing material is foamed, eliminating any gap between the device and the interior walls of the cavity in which it is placed.

The heat expandable sealing material may, in one embodiment, expand at least radially during activation in order to seal against the internal surfaces of the structural member to which the acoustic baffle device is attached, and thus prevent undesirable noises and vibrations produced by the vehicle from being transmitted to the passenger compartment. The heat expandable sealing material may be formulated such that it comes into contact with, but does not adhere or bond to, the interior walls of the cavity when activated and expanded. Alternatively, the components of the heat expandable sealing material may be selected such that in its expanded state the heat expandable sealing material does securely adhere or bond to the interior cavity wall surfaces (i.e., cannot be separated from the wall surfaces without application of significant force). In certain embodiments of the invention, the expanded material derived from the heat expandable sealing material is adhered sufficiently strongly to the cavity wall surfaces such that cohesive failure is observed (i.e., structural failure of the adhesive occurs such that adhesive remains on the surface of both the carrier and the cavity wall when the two items are separated). The expanded material resulting from the heat expandable sealing material may be a closed cell foam. In certain embodiments, the expanded material is relatively low in density (e.g., less than 1200 kg/m$^3$) so that the resulting dampened/sealed hollow structural member remains relatively low in weight, thereby providing vehicles with improved fuel economy. The heat expandable sealing material may be formulated to be capable of expanding at least 100%, at least 250%, at least 500%, at least 750%, at least 1000%, at least 1500%, or at least 2000% of its original volume or even more, if so desired.

The heat expandable sealing material may be assembled with the carrier by any of the known methods for manufacturing acoustic baffle devices, including co-injection molding, side-by-side injection molding, overmolding and insert molding.

An acoustic baffle device can include a carrier, one or more portions of the heat expandable sealing material supported on the carrier, and at least one attachment member which may be integrally molded with the carrier. The carrier may include a concave inner portion that in one embodiment is not covered by the portion(s) of heat expandable sealing material. The carrier may include a structure (such as a step, groove or channel) that substantially surrounds the perimeter of the carrier, that is integrally molded therewith and that is configured to receive the heat expandable sealing material portion (s) prior to expansion.

In addition to the opening through which a tube is to be inserted, the carrier may contain one or more openings which permit coating fluids (e.g., e-coat compositions) or other liquids within which the installed acoustic baffle device is immersed during vehicle assembly to satisfactorily drain.

The overall shape (cross-sectional profile) of the acoustic baffle device is not particularly limited, but is typically configured so as to be similar in shape to, but somewhat smaller than, the cross-section of the structural member cavity in which it is to be placed. Generally, it will be desirable for the outer edge of the acoustic baffle device to substantially parallel the inner wall of the cavity so as to create a gap that is substantially uniform in width between the baffle device and the cavity wall (typically, this gap will be from about 1 to about 10 mm). This gap permits a liquid coating material such as a metal pretreatment solution (e.g., a phosphate bath), primer, or paint to substantially coat the entire interior surface of the hollow structural member before the heat expandable sealing material is activated (i.e., foamed). Furthermore, the structure on the carrier that receives the heat expandable sealing material portion(s) is not particularly limited and may, for example, be in the form of an "L" shaped shelf or flange, a "V", "U", or "C" shaped groove or channel, brackets, tabs, clips or the like. The heat expandable sealing material may be positioned in a channel around the periphery of the carrier and the acoustic baffle device fixed within a hollow structural member so as to create a gap between the heat expandable sealing material and the cavity walls. The channel may include a mounting surface that faces towards the interior surface of the cavity of a vehicle body within which the device is installed as well as side walls that are substantially perpendicular to the longitudinal axis of the cavity. The heat expandable sealing material may also be secured to the carrier by means of holes around the perimeter of the carrier, wherein the heat expandable sealing material extends into or through such holes, or by means of a rim around the perimeter of the carrier and generally perpendicular to the plane of the carrier, wherein the expandable material surrounds such rim. The carrier may contain multiple types of structures that secure the heat expandable sealing material to the carrier. In one embodiment, a supporting structure is employed that helps to direct the heat expandable sealing material as it is expanding towards the interior surface of the cavity that is being sealed, such as the aforementioned side walls. The heat expandable sealing material may be disposed as discrete and separate portions around the periphery of the carrier or may be in the form of a circumscribing and continuous band. The outer edge of the band of heat expandable sealing material may be slightly recessed from the outer edge of the carrier, or may be substantially flush with the outer edge of the carrier, or may extend out beyond the outer edge of the carrier.

When the acoustic baffle device is to be attached to a wall of a structural member, a portion of the attachment member may be inserted into an opening of the wall that is sized to substantially match the attachment member portion that is being inserted. The shape of such opening is not particularly critical and may, for example, be square, circular, rectangular, polygonal, oval, or irregular, provided it is capable of receiving the attachment member and interacting with the attachment member so as to hold the acoustic baffle device in the desired position. More than one attachment member may be employed, if so desired. The attachment member(s) may be of any of the various types of attachment members known in the acoustic baffle device art including clips, pegs, posts, screws and the like, particularly attachment members that may be simply inserted into a cavity wall opening and latched in place (by means of resilient extensions, arms or barbs, for example).

To facilitate insertion of a tube through the opening in the carrier after the device has been placed within a cavity, it will generally be desirable to arrange the device such that the opening is positioned at or near the center point of the cavity as viewed in cross-section. Such an arrangement may be accomplished by coordinating the design of the carrier body and the attachment member(s). Additionally or alternatively, the device may be arranged such that its longitudinal axis is substantially parallel (e.g., ±20° or ±10° or ±5°) to the longitudinal axis of the cavity and/or substantially perpendicular (e.g., ±20° or ±10° or ±5°) to the walls of the cavity. This will help to ensure that excessive force need not be used to insert the tube through the opening and open the flap and that the tube will not bend or fold or fail to be inserted properly.

In certain embodiments of the invention, a portion of the heat expandable sealing material is positioned near the opening in the structural member wall so that upon activation of the heat expandable sealing material the heat expandable sealing material expands to completely block the opening. For example, the attachment member may extend out from the acoustic baffle device through a portion of the heat expandable sealing material. Upon activation, the expanded material may extend through the opening and at least partially encase the attachment member, thereby helping to provide a secure, permanent fixing of the acoustic baffle device within the cavity.

The carrier may also be configured to have one or more projections extending out from the carrier and capable of interacting with the cavity walls so as to stabilize the acoustic baffle device and hold it more securely in the desired position, particularly prior to full activation of the heat expandable sealing material.

The opening which is to be capable of receiving the tube or other such object may be of any suitable size and configuration, but generally will be selected to substantially match the cross-sectional profile of the tube such that the tube may be readily extended through the opening without leaving significant gaps between the outer surface of the tube and the periphery of the opening. For example, both the tube and the opening may be round in cross-section. In one embodiment, the opening defines a plane that is substantially perpendicular to the longitudinal axis of the structural member cavity within which the acoustic baffle device is to be placed. In this embodiment, it is preferred that the end of the tube to be inserted through the opening be beveled or pointed. Such an arrangement has been found to facilitate the desired deflection of the flap away from the opening when the tube is inserted. If the end of the tube is squared off, however, it may be desirable to position the flap at an angle such that it defines a plane that is not perpendicular to the longitudinal axis of the tube as it is inserted through the opening, since the flap which is normally held in position by the spring to block off the opening may thereby be more easily deflected. For example, the flap may be positioned such that it defines a plane that is at an angle not greater than 75°, or not greater than 60°, or not greater than 45°, or not greater than 30° from the longitudinal axis of the tube as it is being inserted through the opening.

The flap component employed in the acoustic baffle device of the present invention may have any suitable configuration and may be constructed of any suitable material, provided that it is capable of being held in place by the spring so as to close off the opening in the carrier through which the tube or the like is to be inserted. Generally speaking, the flap should be configured to match the contours of the opening. For example, where the opening defines a plane, the flap may be planar (flat). In one embodiment, however, the flap has a central portion capable of extending into the opening. The flap may be constructed of a heat-resistant plastic, for example, the same type of plastic used to fabricate the carrier. In another embodiment, the flap may be comprised of a rubber or elastomer such as a polyolefin thermoplastic elastomer, provided such material is sufficiently heat-resistant to still provide effective closing off of the opening after heating the heat expandable sealing material, while permitting the flap to remain capable of being deflected away from the opening upon insertion of a tube. In still another embodiment, the flap may be comprised of a metal such as steel or aluminum. Composite flaps are also suitable, e.g., flaps comprised of two or more materials selected from the group consisting of heat-resistant plastics, rubbers (elastomers), and metals. The flap could also be constructed such that it contains one or more portions of a heat expandable sealing material, similar to the heat expandable sealing material affixed to a periphery of the carrier, which are positioned such that upon activation the sealing material expands. Such expansion of the sealing material portions on the flap may assist in sealing off any gaps that otherwise might exist between the opening in the carrier and the tube that is inserted in such opening, thereby assisting in blocking or reducing the transmission of noise or vibration through the cavity as well as reducing any tendency of the tube to generate noise where it contacts the carrier or flap (by rattling, for example). In the embodiment where a device in accordance with the invention is disposed in a vehicle cavity without a tube being inserted through the opening in the carrier, the expansion of the sealing material associated with the flap helps to permanently secure the flap in place, thus also preventing a source of noise and further helping to block the transmission of sound or vibration through the cavity. One or more portions of the heat expandable sealing material could also be positioned on the carrier within or near the opening for this same purpose.

The flap may have a first end which is attached to the carrier and a second end not attached to the carrier. The first end may, for example, be attached to the carrier through the spring or springs. A hinge mechanism could also or alternatively be employed for such attachment. In one embodiment, the second end of the flap is the end of the flap opposite to the first end. Because it is not attached to the flap, the second end remains free and capable of being displaced relative to the carrier by a tube inserted through the opening in the carrier. For example, the flap may pivot about the first end which is attached to the carrier such that the second end moves outwardly away from the carrier. The first end may also be capable of some movement relative to the carrier, although such displacement is proportionately less than that exhibited by the second end. In one advantageous embodiment, the flap assembly includes a curved projection extending outwards from the second end of the flap. The curved projection may be comprised of the same material as the flap (e.g., metal, plastic) or a different material and may be integral to the flap. A convex surface of this projection may be arranged such that it faces towards the carrier. When a tube or similar object is inserted through the opening in the carrier, causing the second end of the flap to be displaced such that it no longer blocks off the opening, the tube comes into contact with this convex surface. Due to the convex character of the surface, the tube may be more readily slid through the opening and extended completely through and beyond the carrier with little or no tendency for the tube to become hung up on the flap assembly or to encounter undue resistance.

A spring is utilized to hold the flap in position on the carrier so as to block off the opening. A plurality of springs may be employed for this purpose. The spring material and design are selected so as to provide an amount of tension effective to close off the opening while at the same time permitting the tube to be readily extended through the opening, causing deflection of the flap. That is, during normal handling and use of the acoustic baffle device, both before and after activation of the heat expandable sealing material, the opening remains closed off by the flap (i.e, the flap does not fall away from the opening or separate from the opening in the absence of an applied deflecting force). Additionally, it will be desirable for the closed flap to be held in place sufficiently firmly to avoid the generation of any noise or vibration which might otherwise result from the interaction of the carrier and the flap when the assembled vehicle is operated. However, the spring tension should be adjusted such that only a modest amount of pressure applied to the tube when brought into contact with the flap is effective to cause the flap to open and swing away from the opening, thereby permitting the tube to be fully and readily inserted through the opening. The spring also serves the function of retaining the flap in place within the vehicle cavity, thereby also avoiding the possibility of noise or vibration being generated as a result of its displacement from the opening (as could happen, for example, if a separate, removable cap were to be substituted for the flap assembly). In one embodiment, the spring tension is also selected to provide that the flap will return to its original position closing off the opening, in the event the tube is withdrawn from the opening.

In certain embodiments of the invention, the spring is constructed of a relatively thin, resilient material such as metal or plastic. The material should be heat resistant, e.g., capable of withstanding the temperatures which will be experienced during activation of the heat expandable sealing material while retaining sufficient resiliency so as to maintain the flap in the desired position against the carrier wherein the opening is effectively closed off. Many different spring shapes may be employed. For example, the spring may be an elongated strip, generally rectangular in shape, that is capable of flexing. The spring may be curved, bent or otherwise formed, for example in a Z or step shape. The spring shape and configuration are selected such that, when the spring is arranged in cooperation with the carrier and the flap, the flap is held in place against the carrier under a slight to moderate amount of tension so as to close off the opening.

In one embodiment of the invention, the spring is secured to both the carrier and the flap. Such attachment may be accomplished by any suitable method. For example, one or both of the carrier and flap may contain one or more posts which extend through holes at either end of the spring and which are held in place by clips, pins, welding, adhesive or the like. The flap and/or the carrier could also be molded onto one or both of the ends of the spring to secure it.

In one embodiment, the flap and spring are integral rather than separate, joined components. For example, an integral flap/spring component (flap assembly) may be molded from a suitable heat resistant, resilient plastic.

In one embodiment of the invention, the flap is not secured in place to block off the opening using a latch, lock or any other type of mechanical interlocking. This simplifies manufacture of the acoustic baffle device and also avoids any difficulties that might be associated with unlocking or unlatching such a mechanism during insertion of the tube into the opening.

As previously mentioned, the acoustic baffle devices of the invention are useful in combination with drain tubes. Such drain tubes typically are fabricated of flexible plastic and have a generally circular cross section. The outer and inner diameters of the drain tube may be selected and adjusted as appropriate for a given end use application; typically, the drain tube will be about 10 to about 20 mm in outer diameter and have a wall thickness of perhaps 1 to 3 mm. Drain tubes may be installed in any type of vehicle, but are particularly useful in vehicles equipped with sun roofs. Drain tubes could be installed during the so called "body in white step" of vehicle assembly (i.e., before expansion of sealing material) or during the assembly as such (i.e., after expansion of sealing material, for example in the trim shop phase of vehicle assembly).

Figure 2:
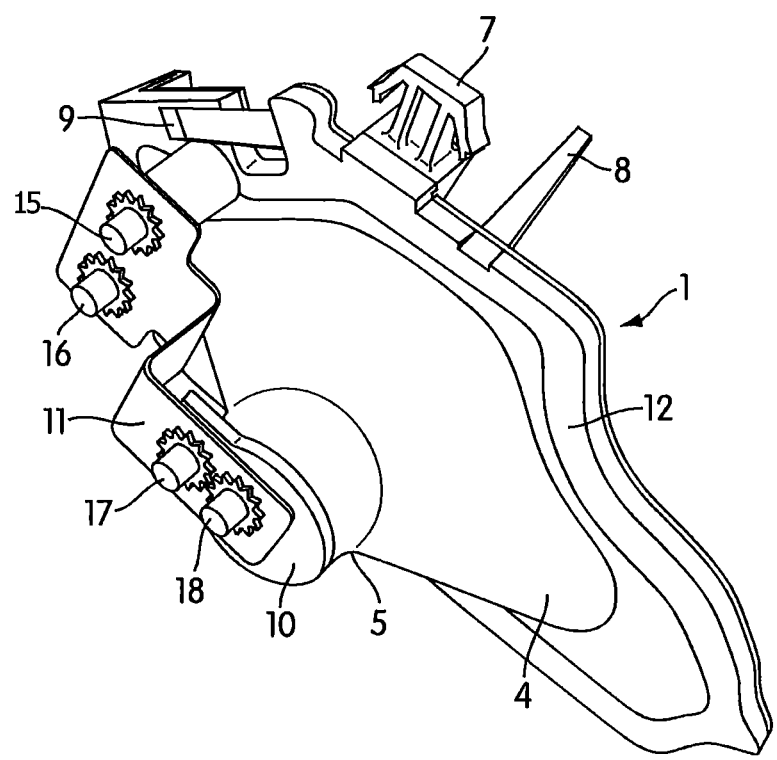

Illustrative embodiments of the invention are shown in the figures. FIGS. 1 and 2 provide different views of an acoustic baffle device 1 in accordance with the invention. A carrier 2 is provided having a portion of heat expandable sealing material 12 affixed to the periphery of carrier 2. Carrier 2 is concave and has an interior portion 4 including a neck 5 proximate to an opening 6, which is capable of receiving an inserted tube such as a drain tube. The interior portion 4 may contain one or more holes in addition to opening 6 that will facilitate the draining of liquids such as coatings and the like during vehicle assembly. These additional holes are typically smaller than opening 6. Carrier 2 thus generally has a funnel shape which facilitates insertion of a drain tube or the like through opening 6, even from a remote location or when the opening 6 is hidden from view within a cavity of a vehicle. Carrier 2 is fitted with an attachment member 7 that is adapted to be inserted into an opening in the interior wall of a structural member defining a cavity, thereby holding acoustic baffle device 1 in place within the cavity. The carrier 2 also bears legs 8 and 9 that assist in stabilizing and securing acoustic baffle device 1 in the cavity. A flap 10 is positioned on the opposite side of carrier 2 and is held in place against opening 6 by spring 11 in a manner effective to close off opening 6. Spring 11 may be fashioned of sheet metal and arranged in a step shape. Spring 11 is fastened to carrier 2 so that it applies some tension to flap 10, thereby pressing it slightly against opening 6. In the embodiment shown in FIG. 2, spring 11 is mounted to posts 15 and 16 which extend outwards from the main body of carrier 2 and at its other end to posts 17 and 18 which extend outwards from flap 10. Heat expandable sealing material 12 is affixed around the periphery of carrier 2. In this embodiment, heat expandable sealing material 12 is present only on the side of carrier 2 which is opposite to the side from which the tube will be inserted into opening 6, so as to avoid interference by the foamed sealing material with the insertion of the tube. Preferably, carrier 2 is designed so that interior portion 4 is substantially free of any flat areas perpendicular to the longitudinal axis of the cavity within which the acoustic baffle device will be positioned, such as area 13 shown in FIG. 1. This will help facilitate insertion of the tube into opening 6, as such flat areas might otherwise cause the tube to hang up and not be guided towards opening 6.

Figure 3:
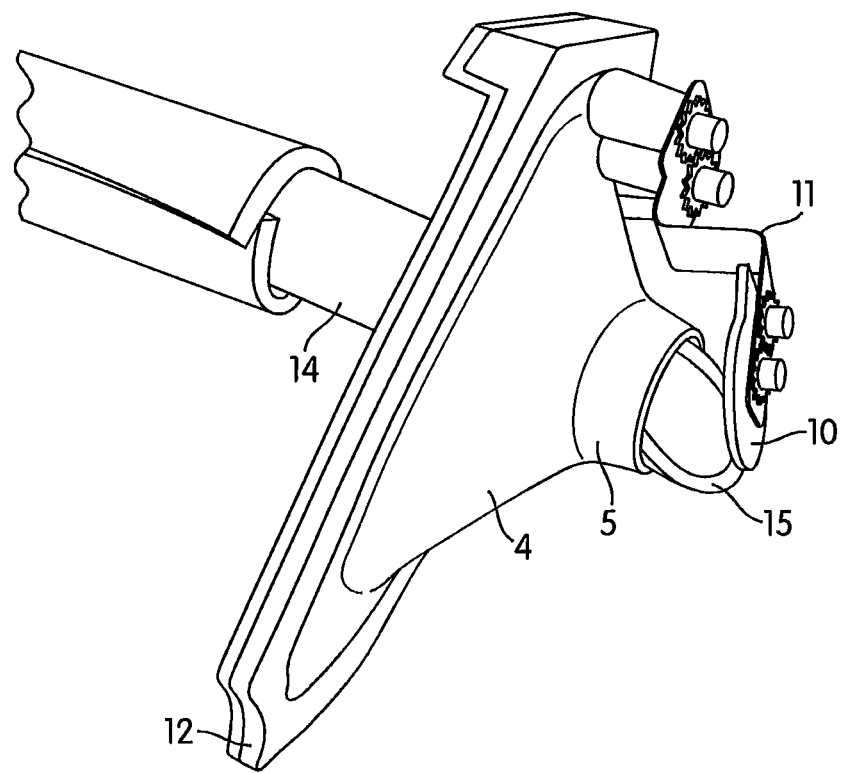
FIGS. 3 and 4 show a drain tube being inserted through the opening of the acoustic baffle device of FIGS. 1 and 2.
Figure 4:
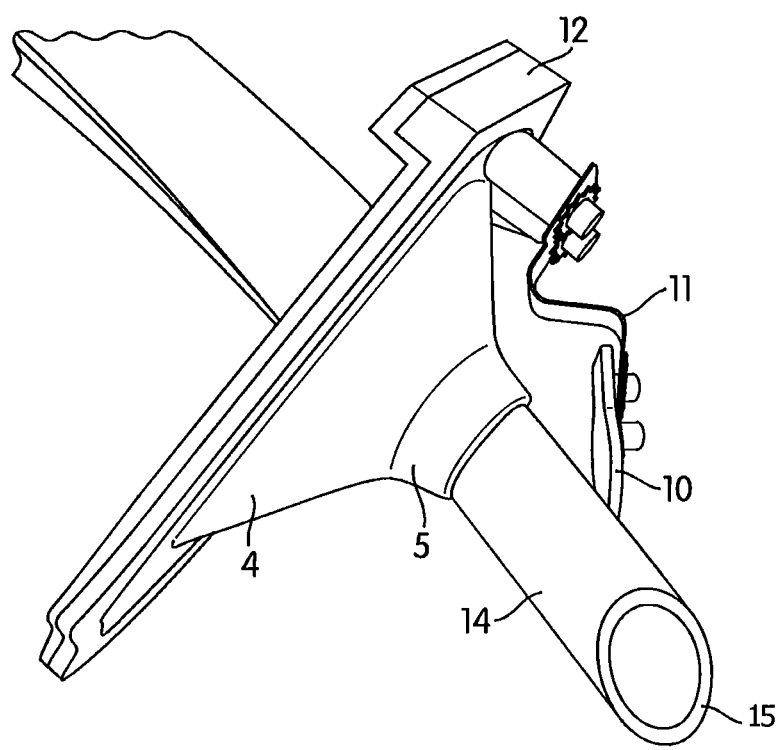

FIGS. 3 and 4 show a drain tube 14 being inserted through opening 6, causing deflection of flap 10 away from opening 6. In the embodiment shown, drain tube 14 has a beveled end 15.

Figure 5:
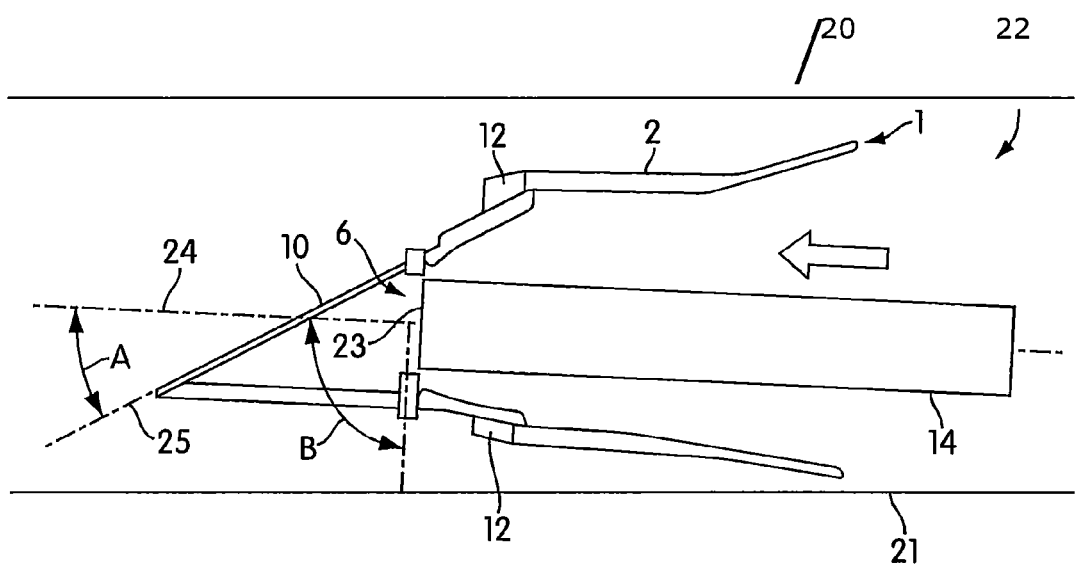
FIG. 5 illustrates in cross-sectional schematic form an acoustic baffle device in accordance with the invention positioned within a cavity.

FIG. 5 illustrates, in cross-sectional schematic form, an acoustic baffle device 1 in accordance with the invention positioned within a cavity 22 defined by cavity wall 20 and cavity wall 21. The acoustic baffle device may be held in place within cavity 22 using one or more attachment members (not shown). Cavity walls 20 and 21 may, for example, be sheet metal and form part of a vehicle pillar. Acoustic baffle device 1 includes carrier 2 having a general funnel shape containing an opening 6. Opening 6 may be closed off by flap 10, held in place by a spring (not shown). Heat expandable sealing material 12 is disposed on the outside of carrier 2. When activated by heating, heat expandable sealing material may expand radially out from carrier 2, coming into contact with the interior surfaces of cavity walls 20 and 21 thereby sealing off cavity 22. Before or after activation of the heat expandable sealing material, tube 14 may be inserted through opening 6. In the embodiment shown, tube 14 has a squared-off end 23. As tube 14 is extended through the acoustic baffle device 1, it comes into contact with the interior surface of flap 10 and pushes flap 10 open. Flap 10 defines a plane 25 that is not perpendicular to the longitudinal axis 24 of the tube 14 as it is inserted through the opening 6, thereby facilitating deflection (opening) of flap 10. For example, flap 10 may be positioned such that it defines a plane 25 that is at an angle A not greater than 75°, or not greater than 60°, or not greater than 45°, or not greater than 30° from the longitudinal axis of the tube as it is being inserted through the opening.

As illustrated in FIG. 5, acoustic baffle device 1 may be arranged such that its longitudinal axis 24 is substantially parallel (e.g., ±20° or ±10° or ±5°) to the longitudinal axis (not shown) of cavity 22 and/or substantially perpendicular (e.g., ±20° or ±10° or ±5°) to cavity walls 20 and 21. Opening 6 defines a plane that is substantially perpendicular (e.g., ±20° or ±10° or ±5°) to the longitudinal axis 24 of acoustic baffle device 1, as indicated by angle B in FIG. 14.

Figure 6:
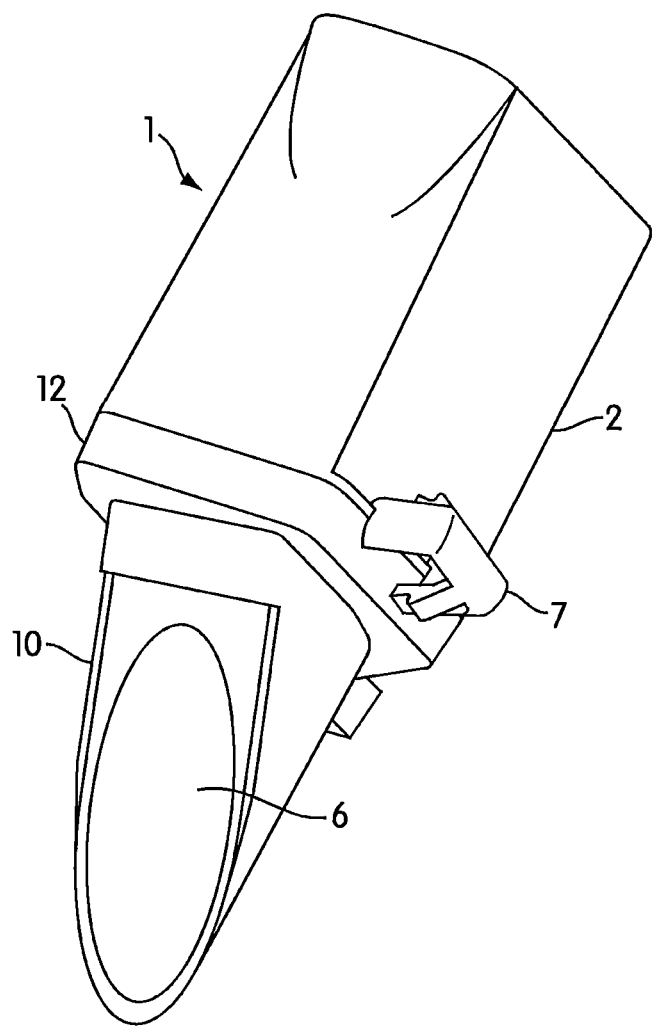
FIGS. 6 and 7 show different views of another embodiment of an acoustic baffle device in accordance with the invention.
Figure 7:
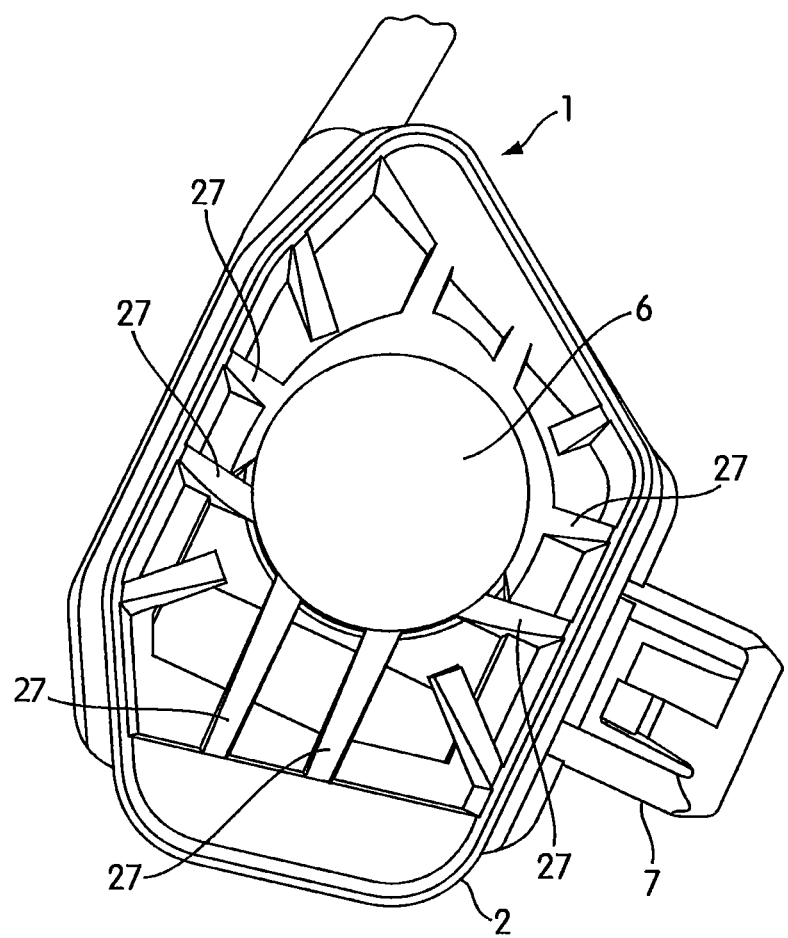

FIGS. 6 and 7 illustrate another embodiment of an acoustic baffle device 1 in accordance with the invention. Carrier 2 has a ring of heat expandable sealing material 12 around its outside circumference and an attachment member 7 projecting therefrom. An opening 6 is present in carrier 2, which is normally sealed off by flap 10 held in place against carrier 2 by tension provided by a spring or the like (not shown). FIG. 7 is an end view of acoustic baffle device 1, showing the open end of carrier 2 into which a tube is to be inserted such that it extends through opening 6. Guide rails 27 are positioned within the interior of carrier 2 which run generally from the open end of carrier 2 towards opening 6 and which have smooth, inwardly facing surfaces angled such that a tube inserted into the open end is readily guided towards opening 6.

Figure 8:
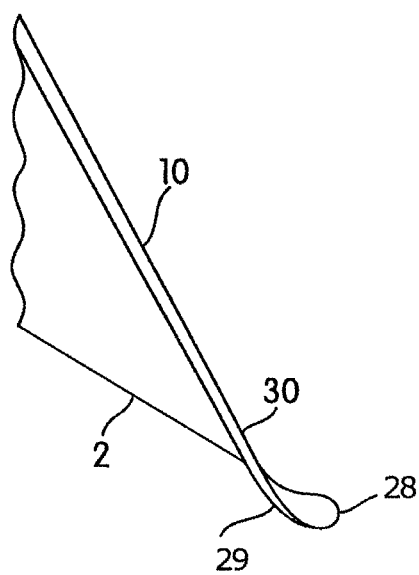
FIGS. 8 and 9 illustrate partial views of an acoustic baffle device in accordance with the invention that has a curved projection extending from the flap.
Figure 9:
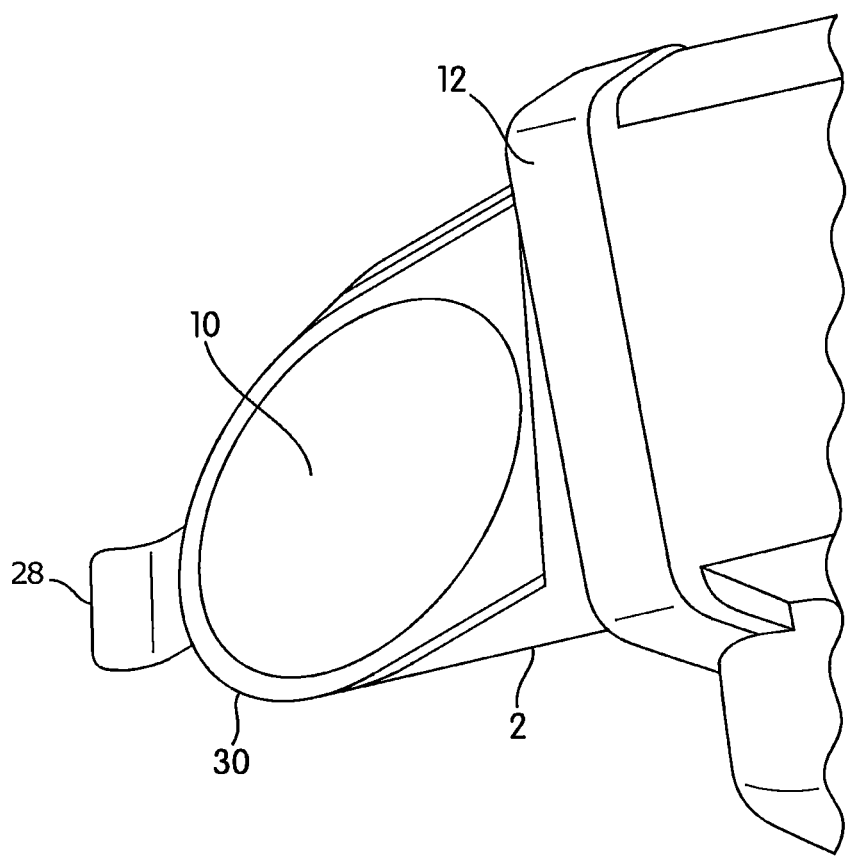

FIGS. 8 and 9 show partial views of an acoustic baffle device 1 in which a curved projection 28 extends outwards from an end 30 of flap 10. A convex surface 29 of projection 28 is arranged such that it faces towards carrier 2 (i.e., facing towards the opening through which a tube is to be inserted). When such a tube or similar object is inserted through the opening in the carrier, causing the end 30 of flap 10 from which curved projection 28 extends to be displaced such that it no longer blocks off the opening, the tube comes into contact with convex surface 29. Due to the convex character of the surface, the tube may be more readily slid through the opening and extended completely through and beyond carrier 2 with little or no tendency for the tube to become hung up on end 30 of flap 10 or to encounter undue resistance. That is, convex surface 29 is arranged and configured such that it generates little friction when the external surface of the tube slides along convex surface 29.

What is claimed is:

1. An acoustic baffle device for sealing a cavity of a vehicle body at a predetermined cross section of the cavity, comprising a carrier having an opening therein, a heat expandable sealing material affixed to the carrier, and a flap assembly having a flap normally held in place by a spring so as to close off the opening, wherein the material and design of the spring are selected so as to provide an amount of tension effective to close off the opening while at the same time permitting the flap to be deflected by insertion of a tube through the opening.

2. The acoustic baffle device of claim 1, wherein the heat expandable sealing material is in the form of at least a partial ring around the periphery of the carrier.

3. The acoustic baffle device of claim 1, wherein the flap is normally held in place by the spring such that the flap defines a plane that is not perpendicular to the longitudinal axis of the tube as the tube is being inserted through the opening.

4. The acoustic baffle device of claim 1, wherein the spring is metallic.

5. The acoustic baffle device of claim 1, wherein the spring is formed of a shaped piece of thin metal.

6. The acoustic baffle device of claim 1, wherein the flap is held in place by the spring so as to close off the opening without using a latch or lock.

7. The acoustic baffle device according to claim 1, wherein the carrier is comprised of a heat resistant plastic.

8. The acoustic baffle device according to claim 1, wherein the flap assembly is assembled or insert-molded securely to the carrier.

9. The acoustic baffle device according to claim 1, wherein the carrier has an inner portion having a concave shape.

10. The acoustic baffle device according to claim 1, wherein the carrier has a neck proximate to the opening that assists in guiding the tube into the opening.

11. The acoustic baffle device according to claim 1, wherein the heat expandable sealing material is affixed only to a side of the carrier that is opposite to a side from which the tube will be inserted through the opening.

12. The acoustic baffle device according to claim 1, wherein the flap and spring are integral and are comprised of heat resistant plastic.

13. The acoustic baffle device according to claim 1, wherein the flap has a first end which is attached to the carrier and a second end not attached to the carrier and wherein the flap assembly includes a curved projection extending outwards from the second end of the flap.

14. A process for sealing a cavity of a vehicle body at a predetermined cross section of the cavity while permitting the reversible opening of a passage for a tube, comprising a step of introducing an acoustic baffle device in accordance with claim 1 into the cavity.

15. The process according to claim 14, additionally comprising heating the acoustic baffle device to a temperature effective to activate the heat expandable sealing material.

16. The process according to claim 15, additionally comprising inserting a to be through the opening.

* * * * *